US010284367B1

(12) United States Patent
Miller et al.

(10) Patent No.: US 10,284,367 B1
(45) Date of Patent: *May 7, 2019

(54) ENCRYPTING DATA IN A STORAGE SYSTEM USING A PLURALITY OF ENCRYPTION KEYS

(71) Applicant: Pure Storage, Inc., Mountain View, CA (US)

(72) Inventors: Ethan Miller, Santa Cruz, CA (US); John Colgrove, Los Altos, CA (US); John Hayes, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/398,898

(22) Filed: Jan. 5, 2017

Related U.S. Application Data

(63) Continuation of application No. 14/258,826, filed on Apr. 22, 2014, now Pat. No. 9,548,972, which is a continuation of application No. 13/627,444, filed on Sep. 26, 2012, now Pat. No. 8,745,415.

(51) Int. Cl.
*H04L 9/08* (2006.01)
*G06F 21/60* (2013.01)

(52) U.S. Cl.
CPC ............ *H04L 9/085* (2013.01); *G06F 21/602* (2013.01)

(58) Field of Classification Search
CPC ..... H04L 63/061; H04L 63/062; H04L 9/085; G06F 21/60; G06F 2221/2107; G06F 21/602
See application file for complete search history.

(56) References Cited

U.S. PATENT DOCUMENTS

| 4,924,514 A | 5/1990 | Matyas et al. |
| 5,208,813 A | 5/1993 | Stallmo |
| 5,403,639 A | 4/1995 | Belsan |

(Continued)

FOREIGN PATENT DOCUMENTS

| CN | 101261663 A | 9/2008 |
| CN | 101309137 A | 11/2008 |

(Continued)

OTHER PUBLICATIONS

PCT Search Report and Written Opinion, dated Feb. 10, 2015; 13 pages, PCT Application No. PCT/US2013/061626.

(Continued)

*Primary Examiner* — Hosuk Song
*Assistant Examiner* — J. Brant Murphy
(74) *Attorney, Agent, or Firm* — Edward J. Lenart; Kennedy Lenart Spraggins LLP

(57) ABSTRACT

A system, method, and computer-readable storage medium for protecting a set of storage devices using a secret sharing scheme. The data of each storage device is encrypted with a key, and the key is encrypted based on a shared secret and a device-specific value. Each storage device stores a share and its encrypted key, and if a number of storage devices above a threshold are available, then the shared secret can be reconstructed from the shares and used to decrypt the encrypted keys. Otherwise, the secret cannot be reconstructed if less than the threshold number of storage devices are accessible, and then data on the storage devices will be unreadable.

20 Claims, 7 Drawing Sheets

(56) References Cited

U.S. PATENT DOCUMENTS

| | | | |
|---|---|---|---|
| 5,557,765 A * | 9/1996 | Lipner | H04L 9/0894 380/285 |
| 5,940,838 A | 8/1999 | Schmuck et al. | |
| 6,035,041 A * | 3/2000 | Frankel | H04L 9/302 380/28 |
| 6,263,350 B1 | 7/2001 | Wollrath et al. | |
| 6,412,045 B1 | 6/2002 | DeKoning et al. | |
| 6,470,454 B1 | 10/2002 | Challener et al. | |
| 6,718,448 B1 | 4/2004 | Ofer | |
| 6,757,769 B1 | 6/2004 | Ofer | |
| 6,799,283 B1 | 9/2004 | Tamai et al. | |
| 6,834,298 B1 | 12/2004 | Singer et al. | |
| 6,850,938 B1 | 2/2005 | Sadjadi | |
| 6,915,434 B1 * | 7/2005 | Kuroda | H04L 9/0833 380/278 |
| 6,931,128 B2 * | 8/2005 | Roberts | H04L 9/0869 380/277 |
| 6,973,549 B1 | 12/2005 | Testardi | |
| 7,028,216 B2 | 4/2006 | Aizawa et al. | |
| 7,028,218 B2 | 4/2006 | Schwarm et al. | |
| 7,039,827 B2 | 5/2006 | Meyer et al. | |
| 7,216,164 B1 | 5/2007 | Whitmore et al. | |
| 7,225,339 B2 | 5/2007 | Asano et al. | |
| 7,599,976 B1 * | 10/2009 | Logue | H04L 9/12 380/46 |
| 7,783,682 B1 | 8/2010 | Patterson | |
| 7,873,619 B1 | 1/2011 | Faibish et al. | |
| 7,913,300 B1 | 3/2011 | Flank et al. | |
| 7,933,936 B2 | 4/2011 | Aggarwal et al. | |
| 7,979,613 B2 | 7/2011 | Zohar et al. | |
| 8,037,319 B1 * | 10/2011 | Clifford | G06F 21/6218 380/277 |
| 8,086,652 B1 | 12/2011 | Bisson et al. | |
| 8,117,464 B1 | 2/2012 | Kogelnik | |
| 8,205,065 B2 | 6/2012 | Matze | |
| 8,321,682 B1 | 11/2012 | Read et al. | |
| 8,352,540 B2 | 1/2013 | Anglin et al. | |
| 8,527,544 B1 | 9/2013 | Colgrove et al. | |
| 8,560,747 B1 | 10/2013 | Tan et al. | |
| 8,621,241 B1 | 12/2013 | Stephenson | |
| 8,700,875 B1 | 4/2014 | Barron et al. | |
| 8,718,283 B2 * | 5/2014 | Whyte | H04L 9/0891 380/286 |
| 8,745,415 B2 | 6/2014 | Miller et al. | |
| 8,751,463 B1 | 6/2014 | Chamness | |
| 8,806,160 B2 | 8/2014 | Colgrove et al. | |
| 8,874,850 B1 | 10/2014 | Goodson et al. | |
| 8,959,305 B1 | 2/2015 | Lecrone et al. | |
| 9,423,967 B2 | 8/2016 | Colgrove et al. | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 9,513,820 B1 | 12/2016 | Shalev | |
| 9,516,016 B2 | 12/2016 | Colgrove et al. | |
| 9,552,248 B2 | 1/2017 | Miller et al. | |
| 2002/0038436 A1 | 3/2002 | Suzuki | |
| 2002/0087544 A1 | 7/2002 | Selkirk et al. | |
| 2002/0094085 A1 * | 7/2002 | Roberts | H04L 9/0869 380/262 |
| 2002/0159601 A1 | 10/2002 | Bushmitch et al. | |
| 2002/0164033 A1 | 11/2002 | Rajasekaran | |
| 2002/0178335 A1 | 11/2002 | Selkirk et al. | |
| 2003/0084290 A1 * | 5/2003 | Murty | H04L 63/0428 713/168 |
| 2003/0140209 A1 | 7/2003 | Testardi | |
| 2004/0049572 A1 | 3/2004 | Yamamoto et al. | |
| 2004/0117649 A1 * | 6/2004 | Whyte | H04L 9/085 380/286 |
| 2005/0033964 A1 | 2/2005 | Albanese et al. | |
| 2005/0066095 A1 | 3/2005 | Mullick et al. | |
| 2005/0132203 A1 | 6/2005 | Dharmarajan | |
| 2005/0216535 A1 | 9/2005 | Saika et al. | |
| 2005/0223154 A1 | 10/2005 | Uemura | |
| 2005/0268345 A1 | 12/2005 | Harrison et al. | |
| 2006/0074940 A1 | 4/2006 | Craft et al. | |
| 2006/0136365 A1 | 6/2006 | Kedem et al. | |
| 2006/0155946 A1 | 7/2006 | Ji | |
| 2007/0067585 A1 | 3/2007 | Ueda et al. | |
| 2007/0162954 A1 | 7/2007 | Pela | |
| 2007/0171562 A1 | 7/2007 | Maejima et al. | |
| 2007/0174673 A1 | 7/2007 | Kawaguchi et al. | |
| 2007/0220313 A1 | 9/2007 | Katsuragi et al. | |
| 2007/0245090 A1 | 10/2007 | King et al. | |
| 2007/0266179 A1 | 11/2007 | Chavan et al. | |
| 2007/0300076 A1 | 12/2007 | Diffie et al. | |
| 2008/0049942 A1 | 2/2008 | Sprunk et al. | |
| 2008/0059699 A1 | 3/2008 | Kubo et al. | |
| 2008/0065852 A1 | 3/2008 | Moore et al. | |
| 2008/0095375 A1 * | 4/2008 | Tateoka | H04L 9/085 380/282 |
| 2008/0134174 A1 | 6/2008 | Sheu et al. | |
| 2008/0155191 A1 | 6/2008 | Anderson et al. | |
| 2008/0178040 A1 | 7/2008 | Kobayashi | |
| 2008/0209096 A1 | 8/2008 | Lin et al. | |
| 2008/0244205 A1 | 10/2008 | Amano et al. | |
| 2008/0275928 A1 | 11/2008 | Shuster | |
| 2008/0285083 A1 | 11/2008 | Aonuma | |
| 2008/0307270 A1 | 12/2008 | Li | |
| 2009/0006587 A1 | 1/2009 | Richter | |
| 2009/0037662 A1 | 2/2009 | La Frese et al. | |
| 2009/0077379 A1 * | 3/2009 | Geyzel | H04L 9/085 713/170 |
| 2009/0099967 A1 * | 4/2009 | Yokota | G06Q 50/22 705/55 |
| 2009/0177894 A1 | 7/2009 | Orsini et al. | |
| 2009/0204858 A1 | 8/2009 | Kawaba | |
| 2009/0228648 A1 | 9/2009 | Wack | |
| 2009/0300084 A1 | 12/2009 | Whitehouse | |
| 2010/0057673 A1 | 3/2010 | Savov | |
| 2010/0058026 A1 | 3/2010 | Heil et al. | |
| 2010/0067706 A1 | 3/2010 | Anan et al. | |
| 2010/0077205 A1 | 3/2010 | Ekstrom et al. | |
| 2010/0082879 A1 | 4/2010 | McKean et al. | |
| 2010/0106905 A1 | 4/2010 | Kurashige et al. | |
| 2010/0153620 A1 | 6/2010 | McKean et al. | |
| 2010/0153641 A1 | 6/2010 | Jagadish et al. | |
| 2010/0191897 A1 | 7/2010 | Zhang et al. | |
| 2010/0215172 A1 * | 8/2010 | Schneider | H04L 9/085 380/28 |
| 2010/0250802 A1 | 9/2010 | Waugh et al. | |
| 2010/0250882 A1 | 9/2010 | Hutchison et al. | |
| 2010/0266120 A1 * | 10/2010 | Leggette | G06F 11/1012 380/28 |
| 2010/0281225 A1 | 11/2010 | Chen et al. | |
| 2010/0287327 A1 | 11/2010 | Li et al. | |
| 2010/0299313 A1 * | 11/2010 | Orsini | H04L 9/085 707/652 |
| 2010/0299521 A1 * | 11/2010 | Koike | H04L 9/083 713/168 |
| 2011/0019818 A1 | 1/2011 | Ma | |
| 2011/0072300 A1 | 3/2011 | Rousseau | |
| 2011/0145598 A1 | 6/2011 | Smith et al. | |
| 2011/0161559 A1 | 6/2011 | Yurzola et al. | |
| 2011/0167221 A1 | 7/2011 | Pangal et al. | |
| 2011/0238634 A1 | 9/2011 | Kobara | |
| 2011/0246766 A1 * | 10/2011 | Orsini | G06F 11/1076 713/160 |
| 2011/0289383 A1 * | 11/2011 | Dhuse | H04L 9/085 714/763 |
| 2012/0023375 A1 | 1/2012 | Dutta et al. | |
| 2012/0036309 A1 | 2/2012 | Dillow et al. | |
| 2012/0117029 A1 | 5/2012 | Gold | |
| 2012/0166818 A1 * | 6/2012 | Orsini | H04L 9/085 713/193 |
| 2012/0198175 A1 | 8/2012 | Atkisson | |
| 2012/0254622 A1 | 10/2012 | Kanungo | |
| 2012/0284534 A1 | 11/2012 | Yang | |
| 2012/0330954 A1 | 12/2012 | Sivasubramanian et al. | |
| 2013/0042052 A1 | 2/2013 | Colgrove et al. | |
| 2013/0046995 A1 | 2/2013 | Movshovitz | |
| 2013/0047029 A1 | 2/2013 | Ikeuchi et al. | |

(56) References Cited

U.S. PATENT DOCUMENTS

| | | |
|---|---|---|
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0208112 A1* | 7/2014 | McDonald ............ H04W 12/04 713/171 |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0250303 A1 | 9/2014 | Miller et al. |
| 2014/0281308 A1 | 9/2014 | Lango et al. |
| 2014/0325115 A1 | 10/2014 | Ramsundar et al. |
| 2015/0127946 A1 | 5/2015 | Miller et al. |
| 2015/0134950 A1 | 5/2015 | Colgrove et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 101419652 A | 4/2009 |
| CN | 102150391 A | 8/2011 |
| CN | 103370685 A | 10/2013 |
| CN | 103370686 A | 10/2013 |
| CN | 104025010 B | 11/2016 |
| EP | 3066610 A1 | 9/2016 |
| EP | 3082047 A1 | 10/2016 |
| EP | 3120235 A | 1/2017 |
| GB | 2344977 A | 6/2000 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1998/049804 A1 | 11/1998 |
| WO | WO-1999/013403 A1 | 3/1999 |
| WO | WO-03/032133 A2 | 4/2003 |
| WO | WO-2008/102347 A1 | 8/2008 |
| WO | WO-2010/071655 A1 | 6/2010 |

OTHER PUBLICATIONS

Shamir, "How to Share a Secret", IP.Com Inc., West Henrietta, NY, US, Mar. 30, 2007, XP013119902, ISSN: 1533-0001, pp. 1-9.

Microsoft Corporation, "GCSettings.IsServerGC Property", Retrieved Oct. 27, 2013 via the WayBack Machine, 3 pages.

Microsoft Corporation, "Fundamentals of Garbage Collection", Retrieved Aug. 30, 2013 via the WayBack Machine, 11 pages.

PCT Search Report and Written Opinion, dated Feb. 18, 2015; 9 pages, PCT Application No. PCT/US2014/064379.

PCT Search Report and Written Opinion, dated Feb. 18, 2015; 11 pages, PCT Application No. PCT/US2014/062383.

Resch et al., "AONT-RS: Blending Security and Performance in Dispersed Storage Systems", FAST'11 Proceedings of the 9th USENIX Conference on File and Storage Technologies, Feb. 15, 2011, 12 pages, USENIX Association Berkeley, CA, USA.

Resch et al., "AONT-RS: Blending Security and Performance in Dispersed Storage Systems", USENIX.org, 26 pages, <http://www.usenix.org/events/fast11/tech/slides/resch.pdf>. [Retrieved Feb. 25, 2015].

Menezes et al., "Chapter 13: Key Management Techniques", Handbook of Applied Cryptography, Oct. 1, 1996, pp. 543-590, CRC Press, Inc., Boca Raton, FL, USA.

* cited by examiner

ENCRYPTING DATA IN A STORAGE SYSTEM USING A PLURALITY OF ENCRYPTION KEYS

CROSS-REFERENCE TO RELATED APPLICATIONS

This application is a continuation application of and claims priority from U.S. patent application Ser. No. 14/258,826, filed on Apr. 22, 2014, which is a continuation of and claims priority from U.S. Pat. No. 8,745,415, issued Jun. 3, 2014.

BACKGROUND

Field of the Invention

This invention relates to storage systems and, more particularly, to a system for securing data from unauthorized access.

Description of the Related Art

Storage systems often utilize a large number of storage devices for storing data. The data stored on the storage devices is typically sensitive, and so there is a need to prevent access to the sensitive data by unauthorized users. This can prove to be challenging in a variety of scenarios. For example, when the storage devices are shipped between locations, it may be difficult to protect against data from being accessed on lost or stolen storage devices.

Other scenarios for losing data are possible and are desired to be avoided. For example, an unauthorized person could come into possession of a storage device and access the data on the storage device. One common approach for preventing this is by requiring a password to access data on the device. However, this solution is less than ideal for a variety of reasons. The password is usually stored somewhere in the storage system, and the password could be stolen. Alternatively, the password may be lost, preventing authorized users from accessing the data on the storage device. Other common solutions for preventing unauthorized access to data suffer from a variety of shortcomings. Therefore, a better solution for securing data on a group of storage devices is desired.

In view of the above, improved systems and methods for protecting access to a set of storage devices are desired.

SUMMARY OF EMBODIMENTS

Various embodiments of systems and methods for preventing unauthorized access to any storage device of a set of storage devices are contemplated. In one embodiment, a storage system may utilize a secret sharing scheme to guard keys for a set of storage devices. In effect, the secret sharing scheme provides a way to take multiple separate physical storage devices and unify them logically into a whole. As a result, any single storage device on its own would not have any readable data. But, if greater than a threshold number of storage devices are present, then the data on the storage devices may be retrieved without requiring any other access mechanisms (e.g., administrator password, USB key, hardware dongle).

In one embodiment, access to a set of storage devices may be permitted only if a threshold number of storage devices of the set are available. In one embodiment, the threshold number of storage devices may be chosen such that the threshold is greater than half the total number of storage devices. In this embodiment, a storage system may be split up evenly into two shelves of storage devices, and the two shelves may be shipped separately to another location. Therefore, since the threshold is greater than half the total number of storage devices, if one of the shelves is lost, the data on the lost shelf of storage devices will be inaccessible. In another embodiment, a storage system may include more than two shelves of storage devices. In this embodiment, the threshold may be set to all the shelves except for one. Alternatively, the threshold may be set to other values for this embodiment.

To prevent unauthorized access to one or more of the storage devices of the storage system, a secret sharing scheme may be utilized. The secret sharing scheme may involve splitting a secret into a collection of shares, such that possession of a sufficient number of shares enables recovery of the secret, but possession of an insufficient number of shares provides little or no information about the secret. One or more shares may be generated for each storage device of the system, and then the share(s) may be stored on their corresponding storage device. If enough of the storage devices are present, then the secret may be reconstructed from the shares stored on these storage devices.

In one embodiment, the data on each storage device may be encrypted with a key, and each storage device may use a separate, unique key to encrypt data on the storage device. Any of a variety of encryption methods may be utilized to encrypt the data on the storage device using the key. In one embodiment, on a given storage device, both a master secret and a second value specific to the given storage device may be used to encrypt the key. In one embodiment, the second value may be a serial number of the given storage device. Therefore, to decrypt data on any of the storage devices of the set, the master secret must first be reconstructed from an adequate number of shares. After the master secret has been reconstructed, the encrypted key may be decrypted using the master secret and the second value. Then, the key may be used to decrypt the data on the corresponding storage device.

These and other embodiments will become apparent upon consideration of the following description and accompanying drawings.

Figure 1:
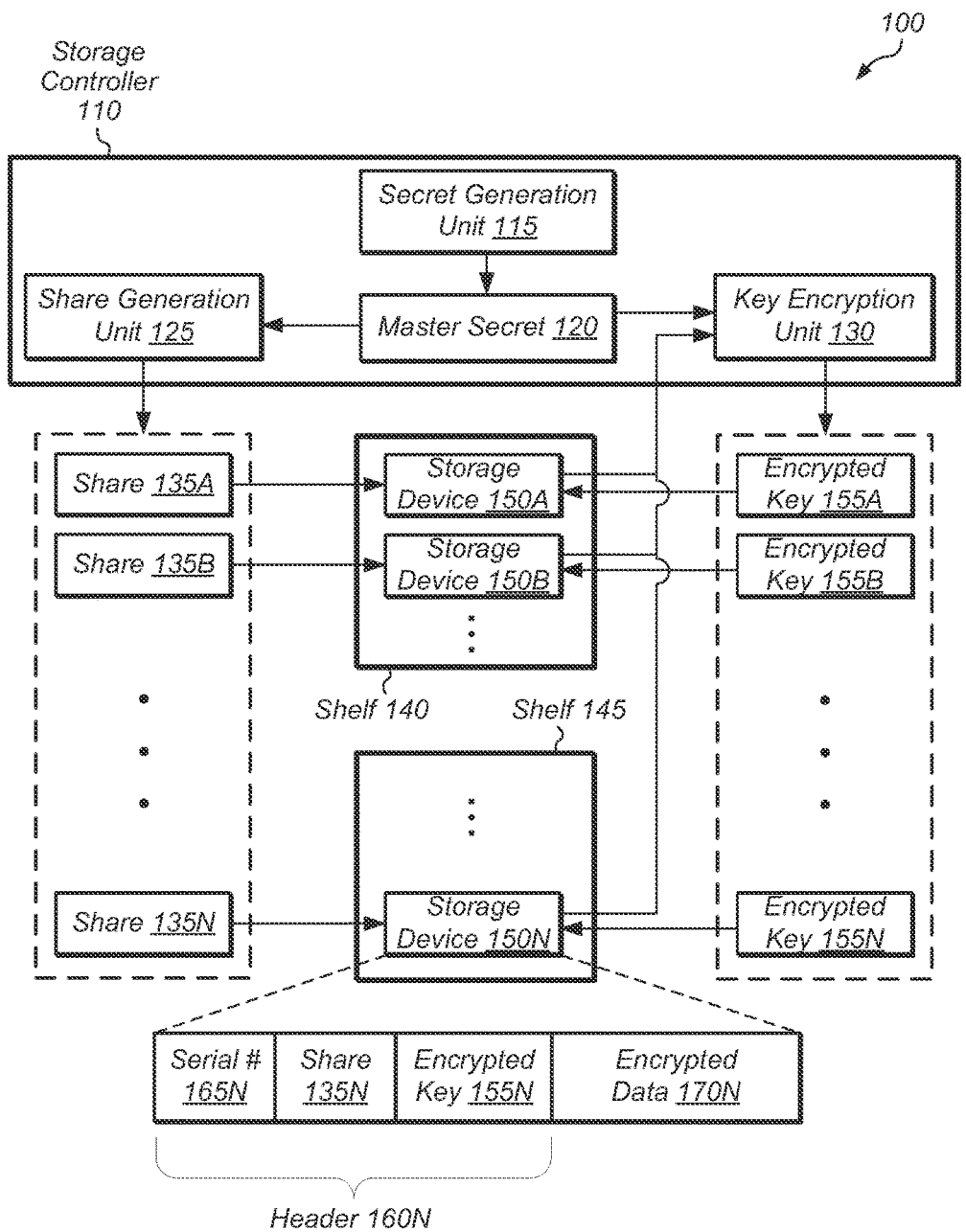
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A computing system comprising a plurality of storage devices . . . " Such a claim does not foreclose the computing system from including additional components (e.g., a network interface, one or more processors, a storage controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring to FIG. 1, a generalized block diagram of one embodiment of a storage system 100 is shown. The storage system 100 may include storage controller 110 and storage devices 150A-N which are included within shelves 140 and 145. Storage controller 110 may implement a secret sharing algorithm to prevent unauthorized access to storage devices 150A-N. The logic, algorithms, and mechanisms described as being included within or implemented by storage controller 110 may comprise hardware and/or software.

In one embodiment, Shamir secret sharing may be used to protect the data in storage system 100. However, it is noted that other secret sharing schemes may be utilized in other embodiments. For example, in other embodiments, other secret sharing schemes, such as Blakley, Krawczyk, or the Chinese Remainder Theorem may be utilized. While the remainder of the description may be specific to Shamir secret sharing, it is to be understood this does not preclude the use of other secret sharing schemes.

Storage controller 110 may include a secret generation unit 115. In one embodiment, for a Shamir secret sharing scheme, unit 115 may be configured to generate a polynomial in the finite (Galois) field, or GF($2^m$), space, wherein m is a positive integer. The polynomial may be generated, and master secret 120 may be one of the terms of the polynomial. It is noted that the terms "master secret" and "shared secret" may be used interchangeably throughout this disclosure. In one embodiment, a polynomial of the following format may be utilized: $f(x)=A_0+A_1x+A_2x^2+A_3x^3+ \ldots +A_{k-1}x^{k-1}$.

In one embodiment, the shared secret may be the value of the constant term '$A_0$' of the polynomial f(x), and the constant term '$A_0$' may be chosen randomly. In other embodiments, the secret may be one of the other terms (e.g., $A_1$, $A_2$) of the polynomial or a combination of two or more terms from the polynomial. The degree of the polynomial may determine the number of shares 'k' out of the total number of storage devices 'n' that will be needed to reconstruct the secret. For example, if the polynomial is a fourth degree polynomial, with the highest-order term being an $X^4$ term, then the number of shares 'k' needed to reconstruct the secret will be five.

In one embodiment, share generation unit 125 may generate a number of shares 'n' equal to the number of storage devices in the storage system. Each share 135A-N generated by share generation unit 125 may be a pair of values, and the pair may be an input to the polynomial and result of the polynomial (x, f(x)). In one embodiment, each share may be generated by setting 'x' to an integer value. For example, 'N' shares may be constructed by setting 'x' to the integer values 1, 2, . . . , N and then computing a corresponding f(x) value. In another embodiment, extra shares may be generated and stored on one or more share servers. Also, in a further embodiment, a new share may be generated for a new drive that replaces a failed drive.

Each share 135A-N may be distributed to and stored on a corresponding storage device 150A-N. The storage devices 150A-N of storage system 100 are shown as being split up into two equal-sized shelves 140 and 145. However, in other embodiments, other numbers of shelves may be utilized in the storage system, and in addition, each shelf may vary in size. For example, in another embodiment, the storage devices 150A-N may be split up and stored within four shelves. Generally speaking, a "shelf" may refer to any physical grouping of storage devices into a single unit. In one embodiment, the required number of shares for reconstructing the master secret may be chosen such that the required number is greater than the number of storage devices in a shelf. In other words, the number of shares needed for reconstructing the master secret should be greater than any number of storage devices that are physically grouped together in a single location when that location may not be secure, as during physical transport.

Although secret generation unit 115, share generation unit 125, and key encryption unit 130 are shown as separate entities within storage controller 110, it will be understood that these may be combined into a single unit in other embodiments. It is also noted that storage controller 110 may include other components and logic not shown in FIG. 1. Furthermore, in some embodiments, units 115, 125, and 130 may be software routines that are invoked from a program executing on one or more processors (not shown) of storage controller 110.

It should be understood that the distribution of functionality illustrated in FIG. 1 is shown for illustrative purposes, and other embodiments may have a different arrangement of functionality among the components. For example, in another embodiment, one or more of units 115, 125, and 130 may be located within shelf 140, shelf 145, any storage device 150A-N, or in another computing device. In some embodiments, if the logic for generating shares and secrets and/or encrypting keys is located within a shelf or storage device, then the shares, secrets, and/or encrypted keys may not be conveyed from the storage controller to the storage devices 150A-N as shown in FIG. 1. Rather, the shares, secrets, and/or encrypted keys may be utilized locally at their respective storage device after they are generated.

In various embodiments, each of the storage devices 150A-N may utilize any of various types of data storage technology. For example, in one embodiment, one or more of the storage devices 150A-N may include storage consisting of solid-state memory to store persistent data. In other embodiments, one or more of the storage devices 150A-N may include storage using other technologies such as spin torque transfer technique, magnetoresistive random access memory (MRAM) technique, shingled disks, memristors, phase change memory, or other storage technologies. In one embodiment, the included solid-state memory may comprise Solid-State Drive (SSD) technology. It is noted that a Solid-State Drive (SSD) may also be referred to as a Solid-State Disk.

Each storage device 150A-N may generate and utilize a key for encrypting the data that is stored on the device. Each storage device 150A-N may include a hardware encryption mechanism that utilizes the key for encrypting the data stored on the device. Alternatively, the keys utilized by storage devices 150A-N may be generated by storage controller 110 or another unit. In one embodiment, to add an extra level of protection, hardware on the storage devices 150A-N may be configured to encrypt these keys. Each key may be encrypted independently and separately from the other keys by the hardware on each storage device 150A-N. Alternatively, in another embodiment, key encryption unit 130 of storage controller 110 may be configured to encrypt the keys. Furthermore, each key may be encrypted independently and separately from the data that is encrypted and stored on each storage device. The key for each storage device may be encrypted using both the master secret 120 and a second value specific to the corresponding storage device. For example, in one embodiment, the second value may be the serial number of the storage device. In another embodiment, the second value may be an identification (ID) or a portion of the ID stored in a header of the storage device. In other embodiments, the second value may be based on other information intrinsic to a given storage device. In further embodiments, multiple device-specific values may be utilized to encrypt the key. Also, in some embodiments, only master secret 120 may be used to encrypt the key.

It is also noted that in another embodiment, the same key may be utilized by two or more storage devices, and key encryption unit 130 may encrypt this key and convey the encrypted key to the storage devices that use the key. Alternatively, in a further embodiment, master secret 120 may be the key that is used to encrypt data on each storage device 150A-N. In this embodiment, each storage device 150A-N may store a share 135 and the encrypted data 170, along with any other device-specific data in header 160. To decrypt the data, the shares of a sufficient number of storage devices 150A-N may be used to reconstruct the master secret 120, then master secret 120 may be used to decrypt the encrypted keys 155A-N, and then the keys may be used to decrypt the encrypted data 170.

In one embodiment, a hash function may be utilized as part of the encryption process. The shared master secret 120 may be hashed with the serial number of a given storage device 150 to generate an intermediate value. Then, the value of the original key used to encrypt data on a given storage device 150 may be encrypted by the intermediate value. The output of this encryption stage may be the encrypted key 155 that is stored on the given storage device 150. Any type of hash function (e.g., MD5, SHA-1) may be utilized in various embodiments. In other embodiments, other encryption techniques may be used to generate encrypted key 155 using master secret 120 and a device-specific value.

In one embodiment, the generation of the shared master secret 120, shares 135A-N, and encrypted keys 155A-N may be performed during the configuration and installation of storage system 100. In addition, these values may be regenerated on a periodic basis to provide better security for storage system 100. For example, in one embodiment, secret generation unit 115 may generate a new master secret 120 on a daily basis. Then, unit 115 may generate new shares 135A-N from the new master secret 120 and distribute these to the storage devices 150A-N. Also, unit 130 may generate encrypted keys 155A-N from the new master secret 120 and distribute these encrypted keys 155A-N to their corresponding storage devices 150A-N.

In other embodiments, other schedules may be utilized to update the shared secret 120, shares 135A-N, and encrypted keys 155A-N. Also, in other embodiments, the steps utilized during the generation of the secrets and keys may vary, and other steps may be incorporated in the updating of the secret sharing scheme. For example, in another embodiment, instead of just re-encrypting the original key to produce a new encrypted key 155, the encrypted data on each storage device 150 may be decrypted and re-encrypted with a new key. Also, in a further embodiment, the original keys used for encrypting data stored on each of storage devices 150A-N may be generated by key generation unit 130 instead of being generated by each storage device.

Storage device 150N is expanded in FIG. 1 to show its separate data components. In one embodiment, storage device 150N may include a serial number 165N, share 135N, encrypted key 155N, and encrypted data 170N. Serial number 165N, share 135N, and encrypted key 155N may be part of header 160N. Alternatively, in another embodiment, encrypted key 155N may be stored on storage device 150N in an area inaccessible to the end user. In this embodiment, encrypted key 155N may only be accessible via an unlock command. Header 160N may also include other information not shown in FIG. 1. It is noted that storage device 150N may be formatted differently in other embodiments. Additionally, storage device 150N may include logic (not shown) for performing encryption.

The format of storage device 150N as shown in FIG. 1 is a format of the data stored in non-volatile memory (e.g., solid state storage, disk drives, or any other suitable storage device). Although not shown in FIG. 1, storage device 150N may also include volatile memory for storing a decrypted key with which reads and writes may be executed. Generally speaking, storage device 150N may use the decrypted key during the reading and writing of data to storage device 150N. When storage device 150N is powered up, there may be an initialization process to get storage device 150N into an operational state. This operational state may allow for the encrypted data 170N to be decrypted and also allow new data to be encrypted and written to storage device 150N. On power up, storage device 150N may retain encrypted key 155N, which is non-useable until it is decrypted to recreate the original key which was used to encrypt the data (encrypted data 170N) stored on device 150N. This process is described in more detail in relation to FIG. 2.

Share 135N may be generated by share generation unit 125. The generation of share 135N may be performed independently and separately from the encryption of the actual data (encrypted data 170N). In other words, user data stored on the storage device 150N is not used in the generation of share 135N. In one embodiment, share 135N may be an input to a polynomial and a result of the polynomial for that particular input. In some embodiments, share 135N may also include additional information. For example, in one embodiment, share 135N may include the value of 'k', which indicates the number of shares that are required to reconstruct shared secret 120.

In one embodiment, the data stored on the storage device may be encrypted with a key unique to the storage device. The encrypted data of storage device 150N is represented by encrypted data 170N. To implement the secret sharing scheme, the key, along with another value specific to the storage device, may be conveyed from each storage device 150 to key encryption unit 130. For example, in one embodiment, storage controller 110 may receive a key and serial number 165N from each storage device 150. The key, serial number 165N, and master secret 120 may be utilized by key encryption unit 130 to generate an encrypted key 155 for the specific storage device 150. In another embodiment, each storage device may be configured to encrypt its respective key locally, and therefore the result of combining master secret 120 with serial number 165N may be conveyed to each storage device in this embodiment. Further variations in the locations and methods of encrypting the keys are possible and are contemplated.

Figure 2:
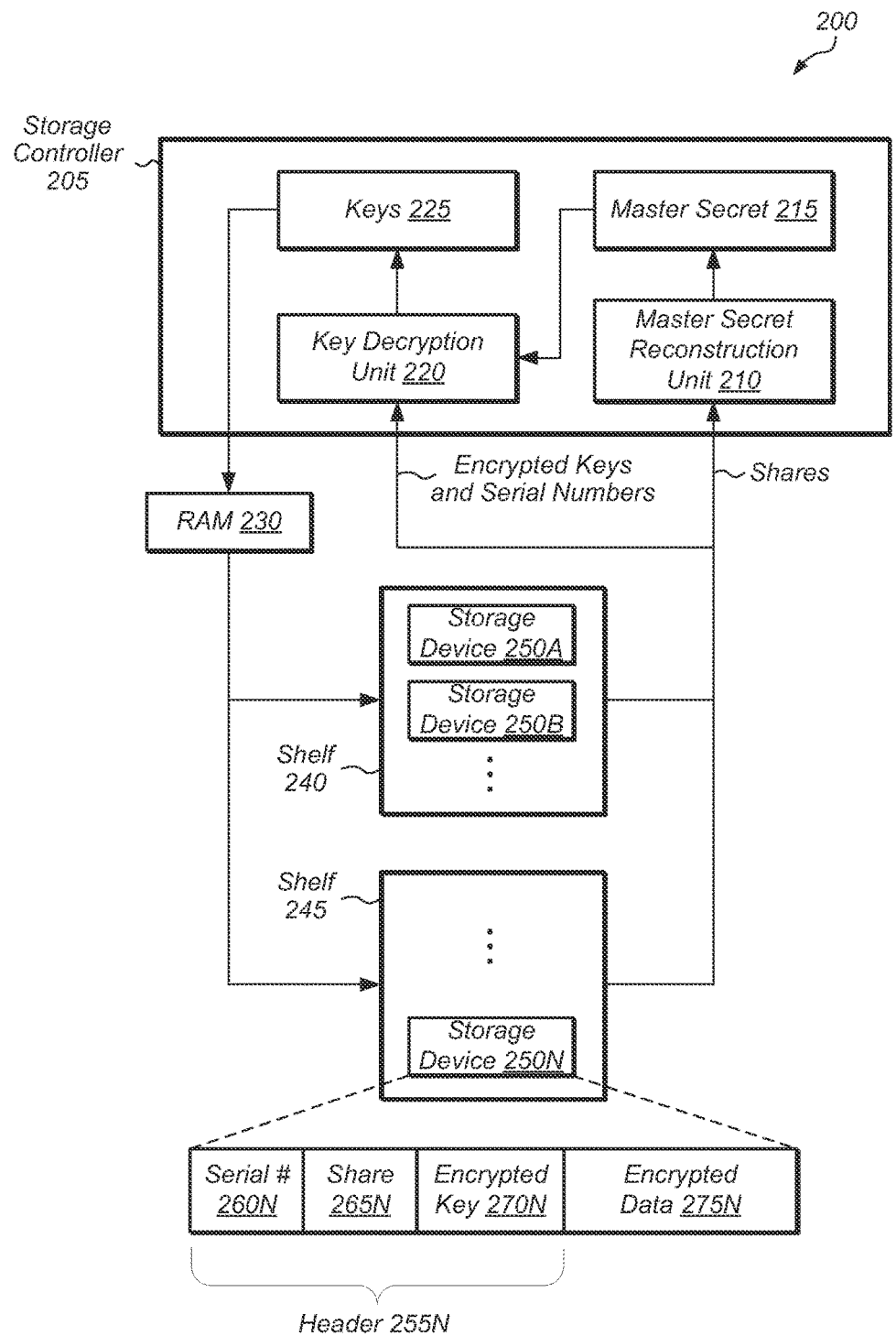
FIG. 2 is a generalized block diagram of another embodiment of a storage system.

Referring now to FIG. 2, a block diagram of another embodiment of a storage system 200 is shown. Storage system 200 includes storage controller 205, and the actual logic used to implement the units shown in storage controller 205 may vary depending on the embodiment. In various embodiments, storage controller 205 may be implemented using hardware, software, or a combination thereof. For example, in one embodiment, units 210 and 220 may represent software that is executed by one or more processors (not shown) of storage controller 205. Furthermore, the logic shown in storage controller 205 may be located within shelves 240 and 245 or storage devices 250A-N in other embodiments.

Storage controller 205 may be coupled to shelves 240 and 245 which include storage devices 250A-N. Storage device 250N is expanded in FIG. 2 to show header 255N and encrypted data 275N. Header 255N may include serial number 260N, share 265N, and encrypted key 270N. Storage controller 205 may also be coupled to random-access memory (RAM) 230.

Storage controller 205 may include master secret reconstruction unit 210. Unit 210 may be configured to receive shares from storage devices 250A-N. As long as enough storage devices are present and accessible, unit 210 may reconstruct master secret 215 from the shares obtained from these storage devices. After master secret 215 has been reconstructed from a sufficient number of shares, then key decryption unit 220 may access and use master secret 215 for decrypting encrypted keys. These operations of reconstructing master secret 215 and decrypting the encrypted keys 270 may be performed a single time on boot up of the storage system 200. After the encrypted keys 270 have been decrypted, they may be stored in a volatile memory (RAM 230) and used multiple times for accesses to storage devices 250A-N. It is noted that this is an advantageous feature of storage system 200 which allows for master secret 215 to be reconstructed and encrypted keys 270 to be decrypted a single time and then reused multiple times.

Key decryption unit 220 may be configured to decrypt the encrypted keys of storage devices 250A-N. Unit 220 may receive encrypted keys and serial numbers from each of the storage devices 250A-N. Unit 220 may use master secret 215 and the serial number from a specific storage device to reverse the encryption process that was used to encrypt the key. Keys 225 are representative of decrypted keys that may be used to decrypt the encrypted data 275 that is stored on the storage device 250A-N. Each storage device 250A-N may have a separate key that is used to encrypt the data stored on the individual device.

Keys 225 may be stored in a variety of locations, depending on the embodiment. Although keys 225 are shown as being stored in storage controller 205, in another embodiment, keys 225 may be stored in RAM 230. In addition, although RAM 230 is shown as a separate unit from storage controller 205, in another embodiment, RAM 230 may be included within storage controller 205.

RAM 230 may be any type of volatile memory such that when RAM 230 is powered down, the keys will not be saved. This helps to prevent an unauthorized user from accessing the keys after they have been decrypted. Each storage device 250A-N may retrieve a corresponding key from RAM 230 and use this key to encrypt and decrypt data during reads and writes from the storage device. Alternatively, each storage device 250A-N may include a portion of volatile memory, and a key may be stored in this volatile memory on the corresponding storage device. Other possibilities of locations for storing the decrypted keys are possible and are contemplated. In one embodiment, the key decryption process may take place entirely on each storage device 250A-N. In this embodiment, storage controller 205 may provide the key used to decrypt the per-device encrypted key 270.

In various embodiments, one or more of the storage devices 250A-N may fail during operation of the overall storage system 200. In response to such a failure, storage controller 205 may be configured to generate a new share for a new storage device that replaces a failed storage device. As part of the process of generating a new share, storage controller 205 may gather sufficient shares to recover the master secret. For example, in one embodiment, when master secret 215 is derived from a polynomial, the required number of shares may be used to solve for all of the coefficients of the polynomial. Then, the polynomial may be evaluated at a different point to generate a new share for the new storage device. For other types of secret sharing schemes, appropriate processes may be utilized to generate a new share for a new storage device that replaces a failed storage device. In another embodiment, storage controller 205 may be configured to generate a new master secret whenever membership changes, such as when an existing storage device fails or when a new storage device is added to the system. Then, the new master secret may be used to refresh encrypted keys and shares on all of the storage devices.

In other embodiments, storage controller 205 may also include many other units and other logic for performing other tasks. For example, storage controller 205 may also include other logic not shown in FIG. 2, such as the logic shown in storage controller 110 of FIG. 1.

Figure 3:
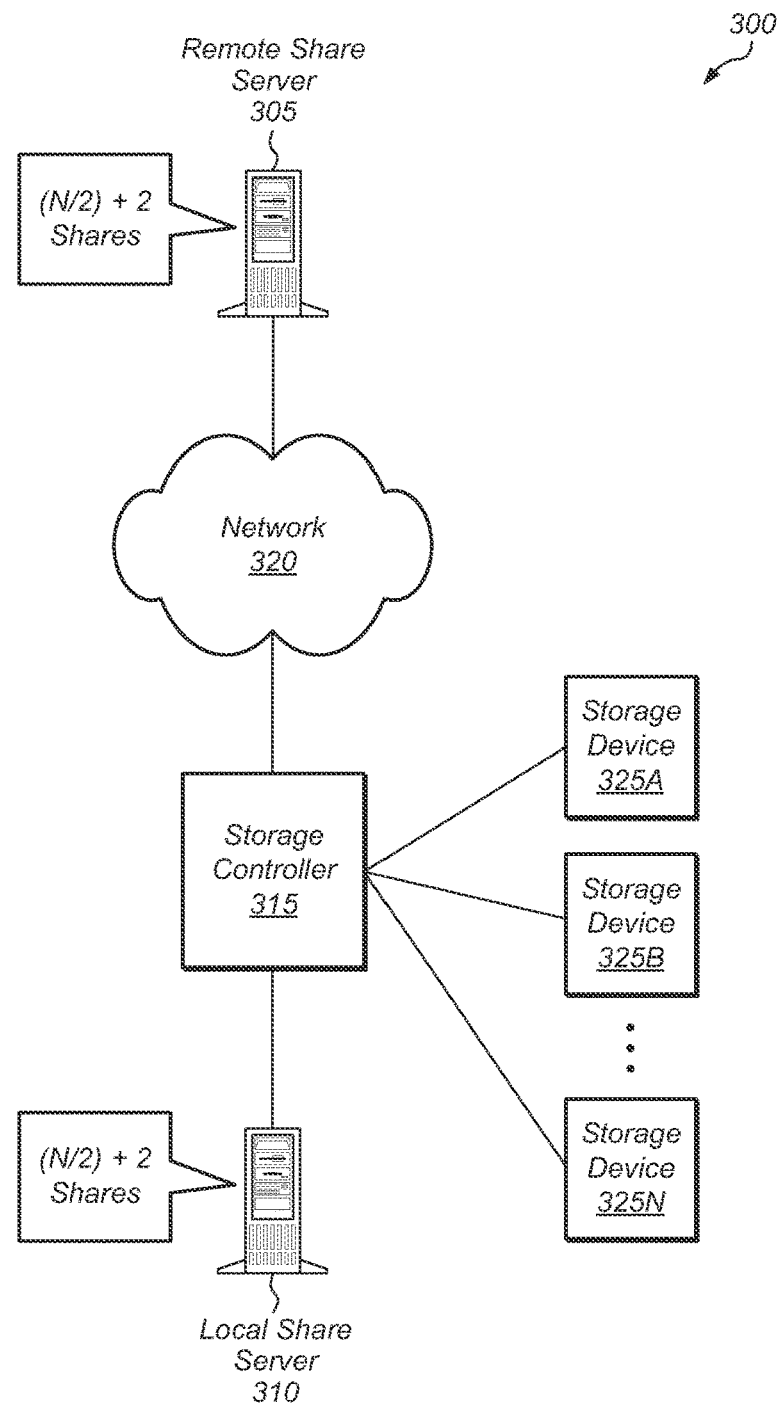
FIG. 3 is a generalized block diagram of one embodiment of a distributed system.

Turning now to FIG. 3, a block diagram of one embodiment of a distributed system is shown. System 300 includes two share servers 305 and 310 which may be utilized by various storage controllers to facilitate access to a small number of storage devices when this small number of devices is not sufficient to reconstruct the master secret. Other systems in other embodiments may have other numbers of local or remote share servers. It is noted that servers 305 and 310 are representative of any number and type of network devices that may be configured to store various numbers of shares.

As shown in FIG. 3, system 300 includes a remote share server 305 and a local share server 310. Storage controller 315 may be coupled to remote share server 305 via network 320, and storage controller 315 may also be coupled to local share server 310. Network 320 may be any type of network, including a wireless connection, direct local area network (LAN) connection, wide area network (WAN) connection such as the Internet, a router, storage area network, Ethernet, and others. In one embodiment, storage controller 315 may be part of a server or computing device, and storage controller 315 may include hardware (e.g., circuitry, dedicated logic, programmable logic, microcode), software (e.g., executable program instructions), or a combination thereof.

Storage controller 315 may be coupled to storage devices 325A-N, which are representative of any number and type (e.g., flash-based memory, solid state drive (SSD), disk) of storage devices. The data stored on each of storage devices 325A-N may be encrypted with a device-specific key, and then each device-specific key may be encrypted using a master key and secret sharing scheme as discussed above. As a result, the data stored on any of the storage devices 325A-N may be decrypted only if enough of the shares are available to reconstruct the shared (master) secret. In the embodiment shown in system 300, remote share server 305 and local share server 310 may each have a number of shares equal to (N/2)+2. For this example, the number of shares needed to reconstruct the secret may be assumed to be (N/2)+3. Therefore, if storage controller 315 is connected to only a single storage device 325 but has access to either share server, then storage controller 315 may be able to access the data on the single storage device 325.

In other embodiments, the number of shares stored on each share server may vary. Also, the number of shares needed to reconstruct the shared secret may vary from embodiment to embodiment. System 300 may be organized in a variety of different manners in other embodiments, such that storage controller 315 if has access to one share server, then storage controller 315 may need shares from different threshold numbers of storage devices depending on the embodiment. For example, in another embodiment, the number of shares needed to reconstruct the shared secret may be N/2. Each share server may include (N/2)−3 shares, such that storage controller 315 may need to access three separate storage devices and their shares to reconstruct the shared secret. Other variations of number of shares needed to reconstruct the secret and number of shares per share server are possible in other embodiments.

The advantages of the arrangement shown in FIG. 3 are that storage controller 315 may be able to access the data on a single storage device 325 by also connecting to either share server. For example, if storage controller 315 was only coupled to a single storage device 325, or if only one storage device 325 was accessible or operational, then storage controller 315 would still be able to access the data on this single storage device 325 with the arrangement of system 300.

It is noted that in other embodiments, storage devices 325A-N may store more than a single share per device. Storage controller 315 may generate multiple shares per storage device and then each storage device 325A-N may store one or more shares. This scheme may also apply to the storage controllers and storage devices shown in FIGS. 1 and 2. The number of shares needed to reconstruct the master secret may be adjusted accordingly such that the minimum number of shares needed to reconstruct the master key is greater than the number of shares stored on any group of storage devices located in a single physical location. In addition, the number of shares needed to reconstruct the master key may also be greater than the number of shares stored in any group of storage devices that may be shipped together in a single shipment. In this manner, should a particular group of devices (e.g., a shelf) be lost in transit, an insufficient number of shares will be present to recover the master key and access the data on the lost group of devices.

Figure 4:
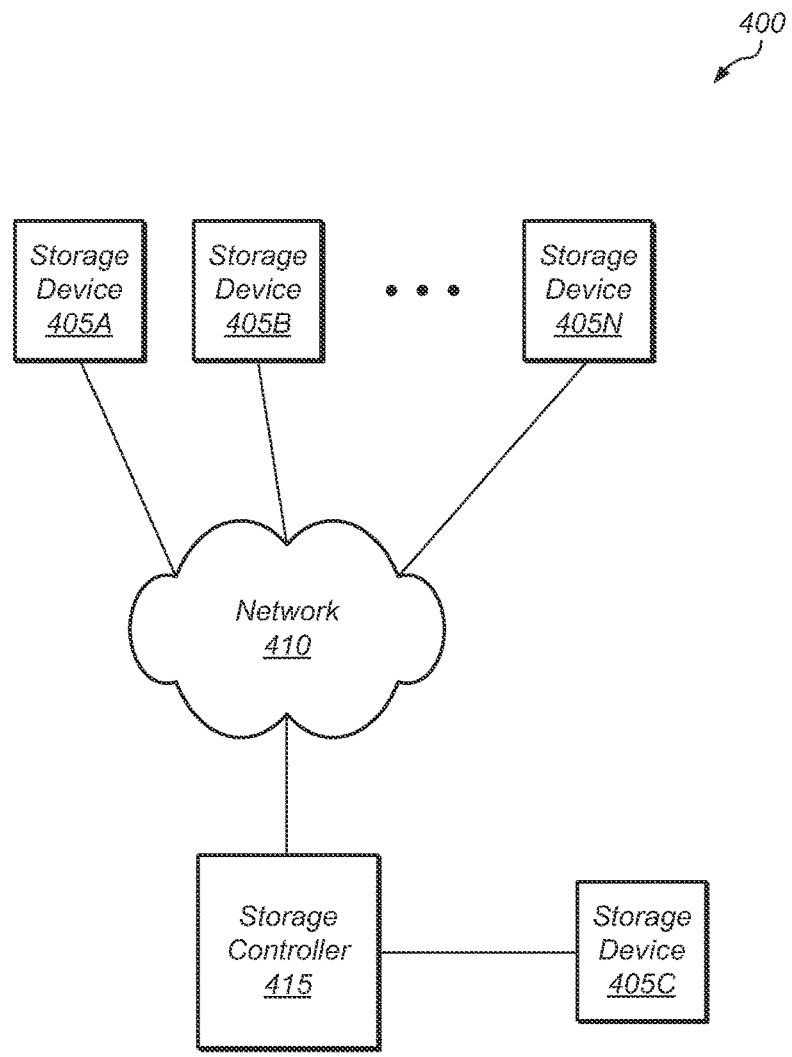
FIG. 4 is a generalized block diagram of another embodiment of a distributed system.

Referring now to FIG. 4, a block diagram of one embodiment of a distributed system 400 of storage devices is shown. System 400 may implement a secret sharing scheme for a set of distributed storage devices. In other words, the storage devices that utilize the secret sharing scheme do not have to be located at a single location. The type of scheme described in FIG. 4 is the same type of scheme described earlier in regard to FIG. 1. However, in FIG. 4, the storage devices are connected across a network, while in FIG. 1, the storage devices are located in a single location.

Storage controller 415 may be directly coupled to storage device 405C, which is representative of any number of storage devices. Storage devices 405A-N may be located in multiple locations, and storage controller 415 may be coupled to storage devices 405A-N via network 410. Network 410 is representative of any type and number of networks.

In one embodiment, storage devices 405A-N may utilize a secret sharing scheme similar to the scheme described in regard to FIG. 1 to prevent unauthorized access to the data stored on storage devices 405A-N. Therefore, storage controller 415 may be unable to read the data on any of the storage devices 405A-N unless at least a number of accessible storage devices 405A-N is above a threshold. In effect, the multiple storage devices 405A-N may be unified by the secret sharing scheme. Any single storage device 405 by itself may not have any readable data, but if a sufficient number of the storage devices 405A-N are available to storage controller 415, then storage controller 415 may access the data on any available storage device without needing a password or other security device. Also, it is noted that once the master secret is reconstructed and individual keys are decrypted, multiple accesses to the storage devices 405A-N may be performed without having to reconstruct the master secret before each access. This is in contrast to other schemes which require the master secret to be reconstructed and the key decrypted each time an access to a storage device 405A-N is made.

Figure 5:
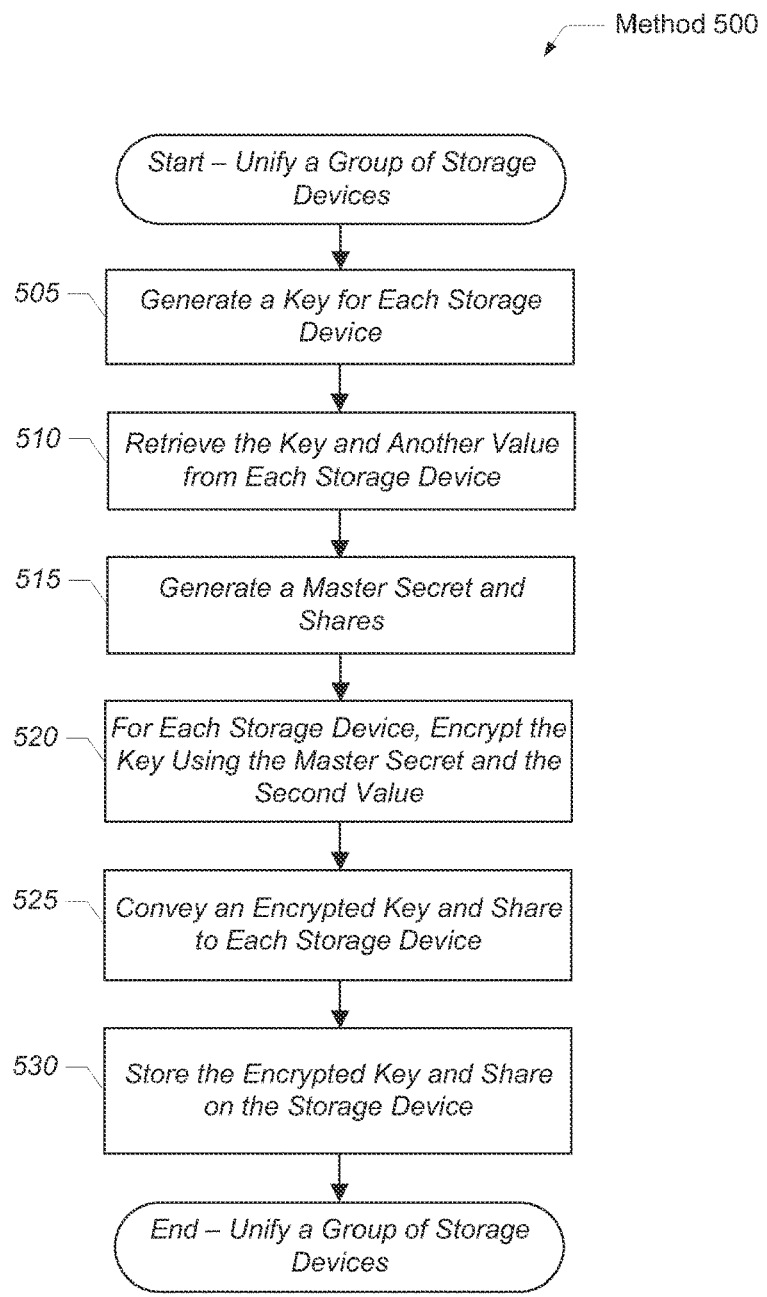
FIG. 5 is a generalized flow diagram illustrating one embodiment of a method for unifying a group of storage devices.

Turning now to FIG. 5, one embodiment of a method for unifying a group of storage devices is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, method 500 may begin with each storage device of the group of storage devices generating a key (block 505). In one embodiment, each storage device may generate the key independently of the other storage devices, and the key may be a randomly generated number. Also, in one embodiment, each storage device may perform the key generation without any input or control from a storage controller or central management unit. The key may be used by each storage device to encrypt data as data is written to the storage device. Each storage device may include hardware configured to use the key to encrypt data. The key may also be used to decrypt data as data is read from the storage device. In another embodiment, keys may be generated elsewhere (e.g., storage controller) and conveyed to each storage device.

Next, a storage controller may retrieve the key and another value from each storage device (block 510). The other value may be any value that is unique to the specific storage device. For example, in one embodiment, the other value may be a serial number of the storage device. The storage controller may be any type of centralized management unit configured to manage the group of storage devices and/or control access to the group of storage devices. In various embodiments, the storage controller may comprise hardware and/or software. For example, in one embodiment, the storage controller may be software executing on one or more processors of a computing device.

The storage controller may generate a single master secret for the entire group and a share for each storage device (block 515). It is noted that in some embodiments, the storage controller may generate a master secret and shares for each storage device prior to retrieving the random key and other value from each storage device. The storage controller may utilize any of a variety of secret sharing schemes to generate the master secret and shares. For example, in one embodiment, the storage controller may utilize Shamir's secret sharing scheme to generate the master secret and the individual shares.

For each storage device, the storage controller may utilize the master secret and the other value to encrypt the storage device's key (block 520). In one embodiment, the second value may be a serial number of the storage device. In one embodiment, the master secret and the serial number may be hashed together and then this value may be used to encrypt the storage device's key. In other embodiments, other encryption schemes may be used to encrypt the key based on the master secret and the device-specific value. Then, the storage controller may convey a corresponding encrypted key and a share to each storage device in the group of storage devices (block 525). The share and the encrypted key may be stored on the storage device (block 530). In one embodiment, the share may be stored in the header of the storage device while the encrypted key may be stored on the storage device in an area inaccessible to the end user. In this embodiment, the encrypted key may only be accessible via an unlock command. After block 530, method 500 may end.

After each of the storage devices have received and stored the share and encrypted key on the device, the storage devices in effect have been unified. The data on any single storage device is unreadable if the other storage devices are inaccessible. Only if a threshold number of storage devices are available will the data on any of the storage devices be able to be decrypted and read.

Figure 6:
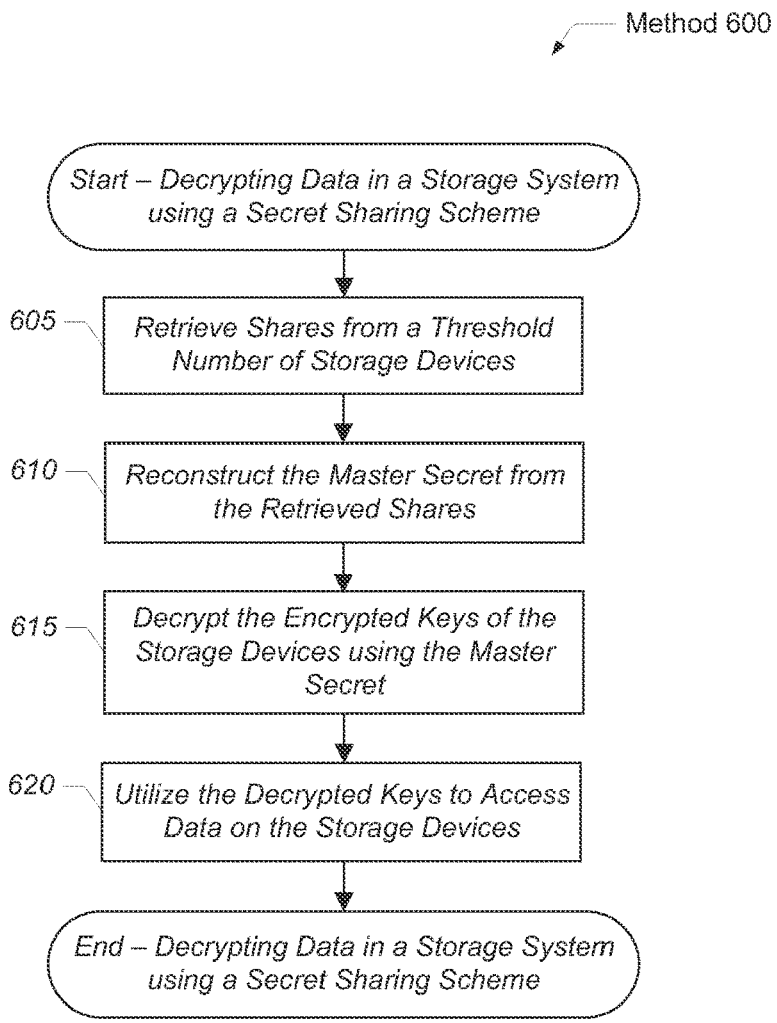
FIG. 6 is a generalized flow diagram illustrating one embodiment of a method for decrypting data in a storage system using a secret sharing scheme.

Turning now to FIG. 6, one embodiment of a method for decrypting data in a storage system using a secret sharing scheme is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 600 may begin by retrieving shares from at least a threshold number of storage devices of the storage system (block 605). The value of the threshold may be determined by the manner in which the master secret was generated. For example, in one embodiment, the master secret may be based on a polynomial, and the threshold may be equal to one more than the degree of the polynomial. In one embodiment, the threshold may be chosen so that it is larger than half the number of storage devices. Next, the master secret may be reconstructed from the retrieved shares (block 610). In one embodiment, polynomial interpolation may be utilized to reconstruct the master secret. More specifically, Lagrange basis polynomials may be computed from the shares as part of the interpolation process used to reconstruct the master secret.

After block 610, the encrypted keys of the storage devices of the storage system may be decrypted using the master secret (block 615). For a given storage device, decrypting the encrypted key may also require a value specific to the given storage device. In one embodiment, this device-specific value may be a serial number of the given storage device. In other embodiments, the device-specific value may be a different attribute of the given storage device (or value otherwise associated with the storage device), such as some piece of data stored in the storage device header. In a further embodiment, the device-specific value may be based on a combination of values, such as a device ID, one or more values stored in the header of the device, and any other suitable value.

After block 615, the decrypted keys may be used for decrypting data on the storage devices of the storage system (block 620). The decrypted keys may also be used for encrypting data that is written to the storage devices. The decrypted keys may be stored in volatile memory such that when the system is powered down, the decrypted keys may be lost. On a reboot, the system may go through method 600 again to decrypt the encrypted keys of the storage devices in the storage system.

Figure 7:
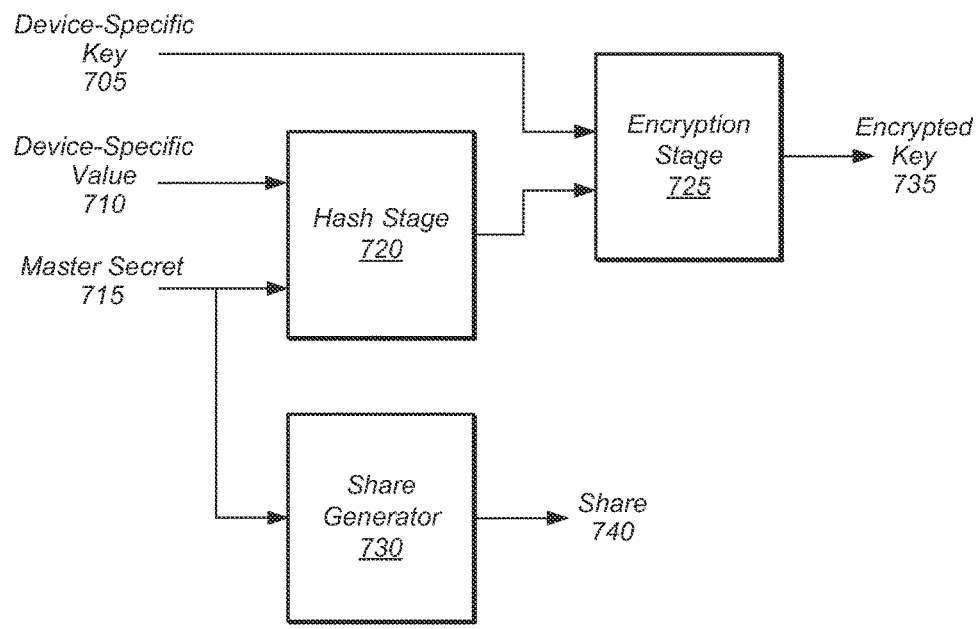
FIG. 7 is a generalized block diagram illustrating one embodiment of the generation of an encrypted key and a share.

Referring now to FIG. 7, a block diagram of one embodiment of the generation of an encrypted key and a share is shown. The block diagram illustrates the generation of an encrypted key and share for each storage device (not shown) of an overall storage system (not shown). Device-specific key 705 is representative of a key that is used to encrypt data stored on a specific storage device. Device-specific value 710 is representative of any value or combination of values unique to the specific storage device. Master secret 715 is representative of the shared secret in a secret sharing scheme.

Device-specific value 710 and master secret 715 may be input to hashing stage 720, and a hashed value may be generated from these two inputs. Hashing stage 720 may utilize any type of hash function to hash together value 710 and master secret 715. The output from hashing stage 720 may be coupled as an input to encryption stage 725. Key 705 may also be coupled as an input to encryption stage 725, and encryption stage 725 may use the output of hashing stage 720 to encrypt the original key 705. The output of encryption stage 725 may be encrypted key 735. Encryption stage 725 may utilize any suitable type of encryption to generate encrypted key 735.

Share generator 730 may be configured to generate a share 740 from master secret 715. In some embodiments, share generator 730 may be configured to generate multiple shares 740 for a single storage device. In one embodiment, share generator 730 may generate a point on a polynomial, and this point may be a share 740. In other embodiments, share 740 may be generated utilizing other techniques. The diagram illustrated in FIG. 7 illustrates the operations that may be performed for a single storage device. For a storage system with a plurality of storage devices, these operations may be repeated for each storage device in the system. An encrypted key 735 and share 740 may be generated for each storage device, and then both the encrypted key 735 and share 740 may be stored on their corresponding storage device. A separate key 705 and separate device-specific value 710 may be utilized for each separate storage device, but the same master secret 715 may be utilized for all of the storage devices in the system.

It is to be understood that FIG. 7 merely illustrates one possible embodiment of the generation of a share and encrypted key for a storage device. In other embodiments, other suitable mechanisms or methods for generating shares and encrypted keys may be utilized.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
    transforming an initial master secret into a final master secret using one or more external secrets, wherein the one or more external secrets are stored separately from a computing system;
    for each storage device of a plurality of storage devices of the computing system, encrypting data on the storage device with a device key, wherein the device key that encrypts the data on one storage device is different than another device key that encrypts data on another storage device; and
    using the final master secret to both encrypt all of the device keys used to encrypt data on the plurality of storage devices, and to generate a plurality of shares from the final master secret.

2. The method as recited in claim 1, wherein the plurality of shares are generated from the final master secret independent of data being encrypted on any given storage device.

3. The method as recited in claim 2, further comprising:
    encrypting each device key using the final master secret and a value unique to a respective storage device of the plurality of storage devices; and
    storing each encrypted device key on the respective storage device.

4. The method as recited in claim 3, further comprising:
    reconstructing the final master secret using a given number of shares of the plurality of shares and decrypt encrypted device keys using the final master secret to generate decrypted device keys;
    storing the decrypted device keys in a volatile memory; and
    using the decrypted device keys to perform a plurality of accesses to one or more storage devices.

5. The method as recited in claim 1, wherein a number of shares needed to reconstruct the final master secret is greater than a number of shares associated with any single physical grouping of storage devices.

6. The method as recited in claim 5, wherein in response to detecting a failed storage device, the method further comprises:
    generating a new master secret;
    encrypting each device key using the new master secret;
    generating a plurality of new shares from the new master secret; and
    storing a separate new share of the plurality of new shares on each storage device of the plurality of storage devices.

7. The method as recited in claim 1, further comprising:
    periodically generating a new master secret on a predetermined schedule;
    encrypting each device key using the new master secret;
    generating a plurality of new shares from the new master secret; and
    storing a separate new share of the plurality of new shares on each storage device of the plurality of storage devices, wherein each new share replaces a previous share stored on each storage device.

8. A computing system comprising a plurality of storage devices, wherein the computing system is configured to:
transform an initial master secret into a final master secret using one or more external secrets, wherein the one or more external secrets are stored separately from the computing system;
for each storage device of the plurality of storage devices, encrypt data on the storage device with a device key, wherein the device key that encrypts the data on one storage device is different than another device key that encrypts data on another storage device; and
use the final master secret to both encrypt all of the device keys used to encrypt data on the plurality of storage devices, and to generate a plurality of shares from the final master secret.

9. The computing system as recited in claim 8, wherein the plurality of shares are generated from the final master secret independent of data being encrypted on any given storage device.

10. The computing system as recited in claim 9, wherein the computing system is further configured to:
encrypt each device key using the final master secret and a value unique to a respective storage device of the plurality of storage devices; and
store each encrypted device key on the respective storage device.

11. The computing system as recited in claim 10, wherein the computing system is further configured to:
reconstruct the final master secret using a given number of shares of the plurality of shares and decrypt encrypted device keys using the final master secret to generate decrypted device keys;
store the decrypted device keys in a volatile memory; and
use the decrypted device keys to perform a plurality of accesses to one or more storage devices.

12. The computing system as recited in claim 8, wherein a number of shares needed to reconstruct the final master secret is greater than a number of shares associated with any single physical grouping of storage devices.

13. The computing system as recited in claim 12, wherein in response to detecting a failed storage device, the computing system is further configured to:
generate a new master secret;
encrypt each device key using the new master secret;
generate a plurality of new shares from the new master secret; and
store a separate new share of the plurality of new shares on each storage device of the plurality of storage devices.

14. The computing system as recited in claim 8, wherein the computing system is further configured to:
periodically generate a new master secret on a predetermined schedule;
encrypt each device key using the new master secret;
generate a plurality of new shares from the new master secret; and
store a separate new share of the plurality of new shares on each storage device of the plurality of storage devices, wherein each new share replaces a previous share stored on each storage device.

15. A non-transitory computer readable storage medium comprising program instructions, wherein the program instructions are executable to:
transform an initial master secret into a final master secret using one or more external secrets, wherein the one or more external secrets are stored separately from a computing system;
for each storage device of a plurality of storage devices of the computing system, encrypt data on the storage device with a device key, wherein the device key that encrypts the data on one storage device is different than another device key that encrypts data on another storage device; and
use the final master secret to both encrypt all of the device keys used to encrypt data on the plurality of storage devices, and to generate a plurality of shares from the final master secret.

16. The non-transitory computer readable storage medium as recited in claim 15, wherein the plurality of shares are generated from the final master secret independent of data being encrypted on any given storage device.

17. The non-transitory computer readable storage medium as recited in claim 16, wherein the program instructions are further executable to:
encrypt each device key using the final master secret and a value unique to a respective storage device of the plurality of storage devices; and
store each encrypted device key on the respective storage device.

18. The non-transitory computer readable storage medium as recited in claim 17, wherein the program instructions are further executable to:
reconstruct the final master secret using a given number of shares of the plurality of shares and decrypt encrypted device keys using the final master secret to generate decrypted device keys;
store the decrypted device keys in a volatile memory; and
use the decrypted device keys to perform a plurality of accesses to one or more storage devices.

19. The non-transitory computer readable storage medium as recited in claim 15, wherein a number of shares needed to reconstruct the final master secret is greater than a number of shares associated with any single physical grouping of storage devices.

20. The non-transitory computer readable storage medium as recited in claim 15, wherein the program instructions are further executable to:
periodically generate a new master secret on a predetermined schedule;
encrypt each device key using the new master secret;
generate a plurality of new shares from the new master secret; and
store a separate new share of the plurality of new shares on each storage device of the plurality of storage devices, wherein each new share replaces a previous share stored on each storage device.

* * * * *